US011250351B2

United States Patent
Rossi et al.

(10) Patent No.: US 11,250,351 B2
(45) Date of Patent: Feb. 15, 2022

(54) SYSTEM AND METHOD FOR ONE-CLASS SIMILARITY MACHINES FOR ANOMALY DETECTION

(71) Applicant: Palo Alto Research Center Incorporated, Palo Alto, CA (US)

(72) Inventors: Ryan A. Rossi, Mountain View, CA (US); Ajay Raghavan, Mountain View, CA (US); Jungho Park, Gwangmyeong-si (KR)

(73) Assignee: Palo Alto Research Center Incorporated

( * ) Notice: Subject to any disclaimer, the term of this patent is extended or adjusted under 35 U.S.C. 154(b) by 863 days.

(21) Appl. No.: 16/032,944

(22) Filed: Jul. 11, 2018

(65) Prior Publication Data
US 2020/0019890 A1  Jan. 16, 2020

(51) Int. Cl.
*G06F 9/44* (2018.01)
*G06N 20/10* (2019.01)
*G06N 20/00* (2019.01)
*G06F 11/34* (2006.01)
*G06F 17/18* (2006.01)
*G06F 7/08* (2006.01)

(52) U.S. Cl.
CPC ......... *G06N 20/10* (2019.01); *G06F 11/3409* (2013.01); *G06F 11/3452* (2013.01); *G06F 17/18* (2013.01); *G06N 20/00* (2019.01); *G06F 7/08* (2013.01)

(58) Field of Classification Search
CPC .................................................. G06N 20/10

USPC ......................................................... 706/10
See application file for complete search history.

(56) References Cited

U.S. PATENT DOCUMENTS

| 2005/0049990 | A1* | 3/2005 | Milenova | G06K 9/6253 706/48 |
| 2006/0093208 | A1* | 5/2006 | Li | G06K 9/6276 382/159 |
| 2013/0304909 | A1* | 11/2013 | Pappu | H04L 47/823 709/224 |
| 2015/0078629 | A1* | 3/2015 | Gottemukkula | G06T 11/60 382/117 |

* cited by examiner

*Primary Examiner* — Timothy A Mudrick
(74) *Attorney, Agent, or Firm* — Shun Yao; Park, Vaughan, Fleming & Dowler LLP

(57) ABSTRACT

One embodiment provides a system for facilitating anomaly detection. During operation, the system determines, by a computing device, a set of training instances, wherein a training instance represents a single class of data within a predefined range. The system computes a similarity score for each testing instance in a set of testing instances, wherein the similarity score is based on a similarity function which takes as input a respective testing instance and the set of training instances. The system determines a boundary threshold based on an ordering of the similarity score for each testing instance. The system classifies a first testing instance as an anomaly responsive to determining that the first testing instance falls outside the boundary threshold, thereby enhancing data mining and outlier detection in the single class of data using unlabeled training instances.

17 Claims, 6 Drawing Sheets

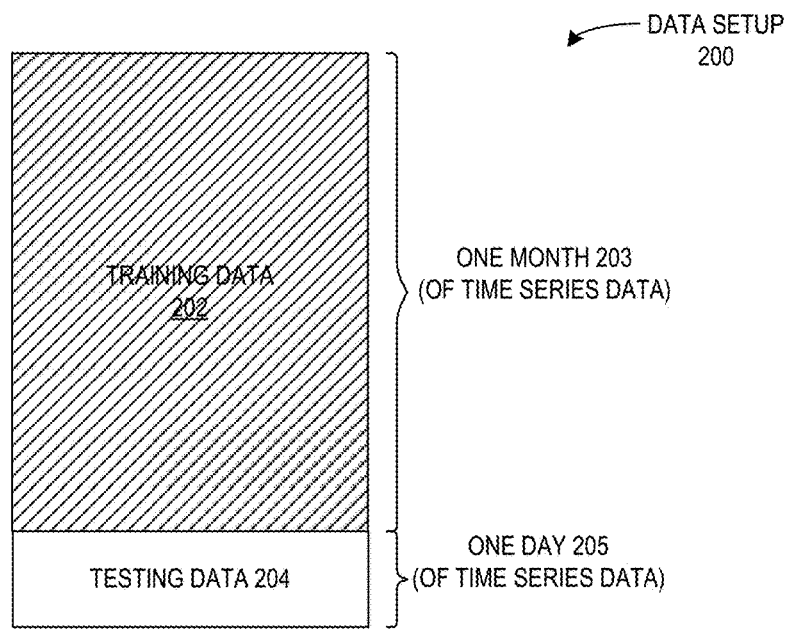
FIG. 2
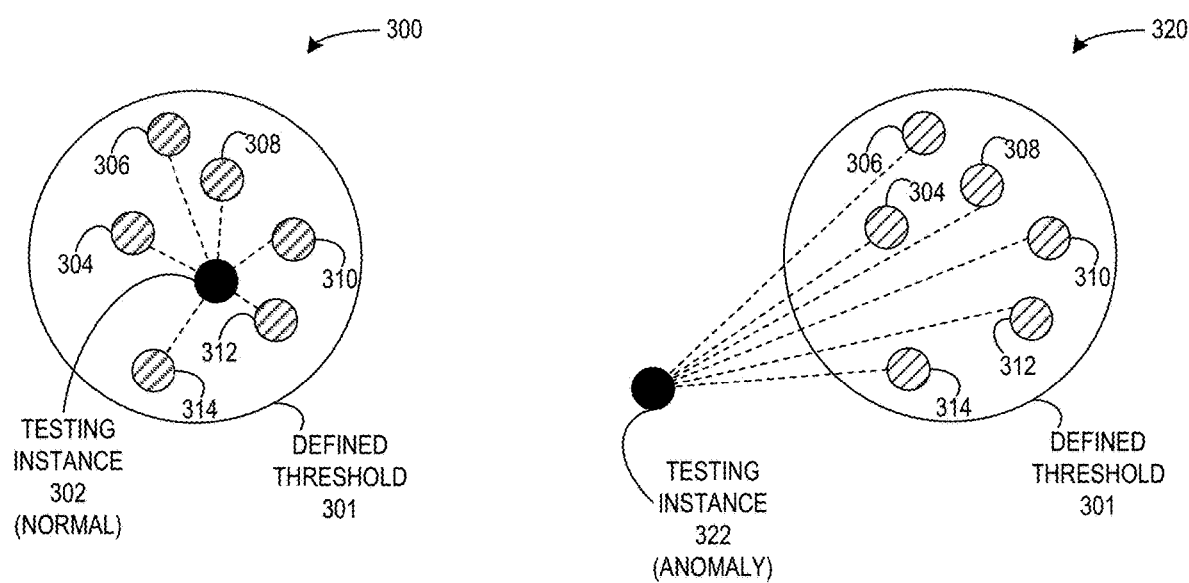
FIG. 3A
FIG. 3B

SYSTEM AND METHOD FOR ONE-CLASS SIMILARITY MACHINES FOR ANOMALY DETECTION

BACKGROUND

Field

This disclosure is generally related to detecting anomalies. More specifically, this disclosure is related to a system and method for using one-class similarity machines to facilitate detecting anomalies.

Related Art

Anomaly detection, or outlier detection, is a data mining method which identifies items or events that do not conform to an expected pattern or others in a data set (e.g., a training data set). Anomaly detection is relevant in various fields, e.g., manufacturing, medical areas, and energy-related fields. For example, in manufacturing, energy usage can incur a significant cost, such as in running a factory with machines or a data center with many machines. To this end, identifying anomalies may provide a more efficient manufacturing system, which can in turn reduce costs and improve the overall efficiency of the system as well as its constituent components or parts.

The type of anomaly detection method used can differ based on the type of classification needed. For example, given data of only one class, the goal is to determine, based on training data, whether new test data is a member of the class. One method for detecting anomalies given only one class is one-class support vector machines (SVMs). An SVM is a supervised learning model which analyzes data for classification. The training data set for an SVM includes data points which are each labeled as either belonging or not belonging to a specific class. However, because an SVM requires a full labeled training set, this approach may result in a less efficient anomaly detection method. Furthermore, in an SVM, the target function cannot be approximated locally, and also may be unable to handle changes in the problem domain. This can result in an inefficient system for data mining and anomaly detection.

SUMMARY

One embodiment provides a system for facilitating anomaly detection. During operation, the system determines, by a computing device, a set of training instances, wherein a training instance represents a single class of data within a predefined range. The system computes a similarity score for each testing instance in a set of testing instances, wherein the similarity score is based on a similarity function which takes as input a respective testing instance and the set of training instances. The system determines a boundary threshold based on an ordering of the similarity score for each testing instance. The system classifies a first testing instance as an anomaly responsive to determining that the first testing instance falls outside the boundary threshold, thereby enhancing data mining and outlier detection in the single class of data using unlabeled training instances.

In some embodiments, the similarity function is based on one or more of: a radial basis function; a linear kernel function; a polynomial function of a predetermined degree; a similarity function which meets specific characteristics of the training instances and the testing instances; and any similarity function.

In some embodiments, prior to computing the similarity score for each testing instance, the system pre-processes the set of training instances by: determining one or more potential anomalies in the set of training instances; and removing the one or more potential anomalies based on a method for detecting outliers in a set of data.

In some embodiments, the system applies, to the training instances and the test instances, a normalization or a scaling technique based on one or more of: a minimum maximum scaling technique; an L1-norm or a least absolute deviations method; an L2-norm or a least squares method; and any normalization or scaling technique.

In some embodiments, applying the normalization or the scaling technique further comprises applying the normalization or the scaling technique to one or more of: a feature vector, wherein the feature vector describes a set of numeric features associated with an object or a testing instance; values of time series variables at a first point in time, wherein the set of training instances and the set of testing instances include the time series variables at multiple points in time; and each time series variable.

In some embodiments, prior to computing the similarity score for each testing instance, the system reduces a total number of the training instances based on one or more of: a downsampling technique; removing redundant training instances; and a technique that reduces the total number of the training instances.

In some embodiments, the system computes a second similarity score for each training instance, wherein the second similarity score is based on a second similarity function which takes as input a respective training instance and each of a remainder of the training instances. The system determines a second boundary threshold based on an ordering of the second similarity score for each training instance. The system classifies a second testing instance as an anomaly responsive to determining that the second testing instance falls outside the second boundary threshold.

BRIEF DESCRIPTION OF THE FIGURES

FIG. 2 illustrates an exemplary data setup for facilitating anomaly detection, in accordance with an embodiment of the present invention.

FIG. 3A illustrates an exemplary result of a normal testing instance, in accordance with an embodiment of the present invention.

FIG. 3B illustrates an exemplary result of an anomaly testing instance, in accordance with an embodiment of the present invention.

In the figures, like reference numerals refer to the same figure elements.

DETAILED DESCRIPTION

Figure 1:
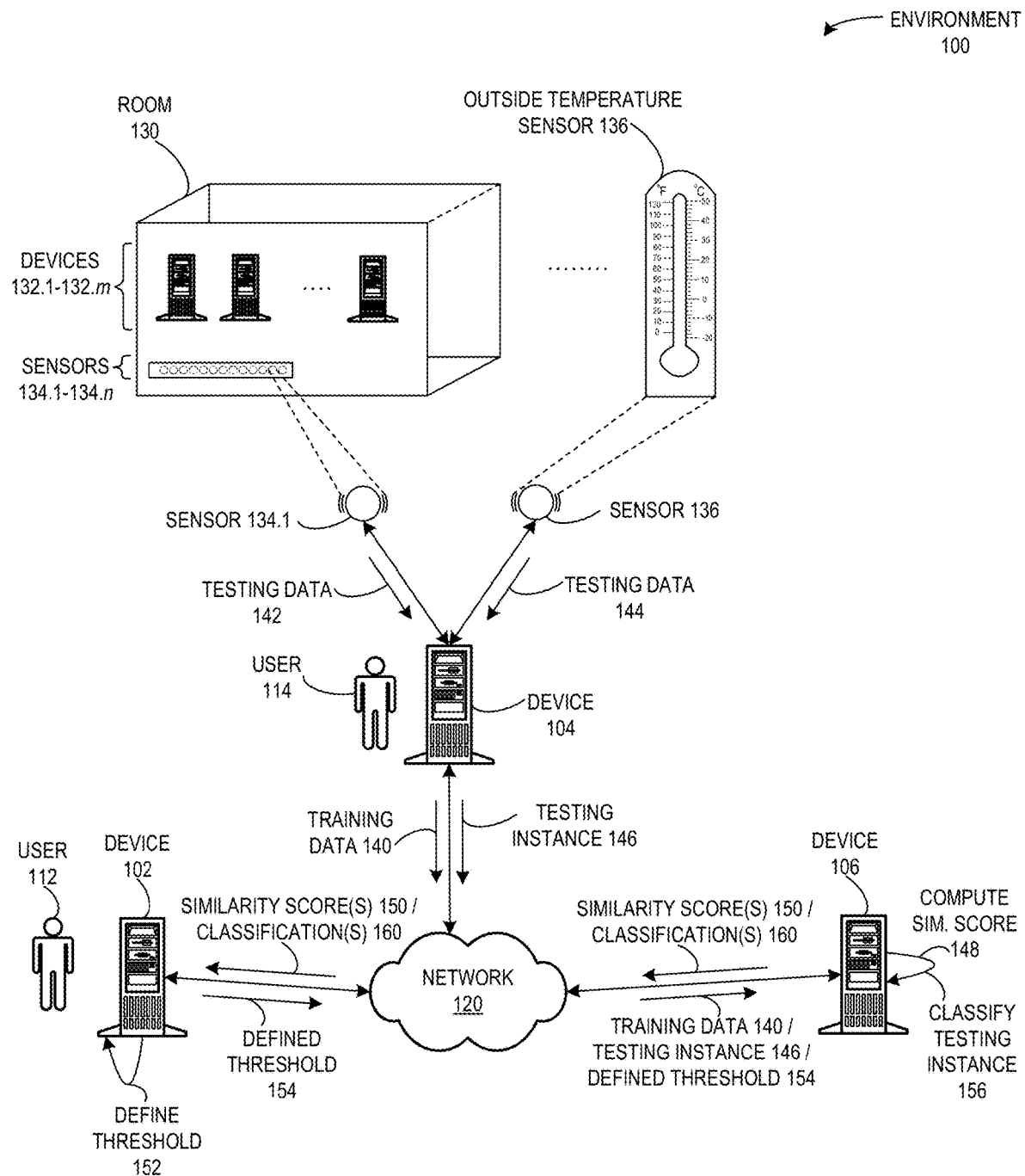
FIG. 1 illustrates an exemplary environment for facilitating anomaly detection, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the problem of efficiently classifying data for anomaly detection based on one-class similarity machines. In general, the type of anomaly detection method used can differ based on the type of classification needed. For example, given data of only one class, the goal is to determine, based on training data, whether new test data is a member of the class. One method for detecting anomalies given only one class is one-class support vector machines (SVMs). An SVM is a supervised learning model which analyzes data for classification. The training data set for an SVM includes data points which are each labeled as either belonging or not belonging to a specific class. However, because an SVM requires a full labeled training set, this approach may result in a less efficient anomaly detection method. Furthermore, in an SVM, the target function cannot be approximated locally, and also may be unable to handle changes in the problem domain. This can result in an inefficient system for data mining and anomaly detection.

The embodiments described herein address this challenge by using a one-class similarity machine to effectively classify data for anomaly detection. A one-class similarity machine involves an unsupervised method used to detect anomalies, by identifying objects of a specific class amongst all objects. A one-class similarity machine can learn from a training set containing objects of the specific class. For example, data points indicating the temperature of a specific room compared to the amount of energy consumed by a heating, ventilation, and air conditioning (HVAC) system can comprise a single training set of objects of this same class.

The embodiments described herein provide a system which can determine a set of training instances, which each represent a single class of data within a predefined range. Given a set of testing instances, the system can compute a similarity score for a testing instance. The similarity score can be based on a similarity function which takes as input the testing instance and the set of training instances. The system can also determine a boundary threshold based on an ordering of the similarity scores for the set of testing instances. The system can determine that a specific testing instance falls outside the (predefined) boundary threshold, and can subsequently classify the specific testing instance as an anomaly. The system can enhance data mining and outlier detection in the single class of data using unlabeled training instances.

Thus, the embodiments described herein provide a computer system which improves the efficiency of detecting anomalies by using unlabeled training data. The system enhances and improves data mining and outlier detection in a single class of data using the unlabeled training instances, where the data represents a single class of data associated with a physical system, and where the improvements are fundamentally technological. The improvements can result in a more efficient manufacturing system or other physical system by more effectively identifying anomalies. A system administrator or other user can take a remedial or other action based on the identified anomalies to improve the overall efficiency of the manufacturing or other physical system.

Furthermore, the embodiments described herein provide a technological solution (computing similarity scores and determining boundary thresholds based on one-class similarity machines to detect anomalies) to a technological problem (improving the efficiency of a manufacturing or other physical system by allowing a user to take an action based on the detected anomalies to, e.g., remove or address the anomalies).

Exemplary Environment and Communication

FIG. 1 illustrates an exemplary environment 100 for facilitating anomaly detection, in accordance with an embodiment of the present invention. Environment 100 can include: a device 102 and an associated user 112; a device 104 and an associated user 114; and a device 106. Devices 102, 104, and 106 can communicate with each other via a network 120. Environment 100 can also include a physical object with sensors which can record data over a period of time and at periodic intervals. For example, environment 100 can include: a room 130 which can include devices 132.1-132.$m$ and sensors 134.1-134.$n$; and an outside temperature sensor 136. Sensors 134.1-134.$n$ can monitor a physical feature of the room, such as an amount of heating, ventilation, and air conditioning (HVAC) energy consumed in room 130 or the amount of HVAC energy consumed or used by a specific device in room 130. Outside temperature sensor 136 can monitor the temperature of the air outside the room, whether inside a same building or outside of the building in which room 130 resides.

During training, device 104 can send training data 140 to device 106 via network 120. Subsequently, the sensors can send their respective measured testing data to device 104. For example, sensor 134.1 can send testing data 142 and sensor 136 can send testing data 144 to device 104, which can generate and send a testing instance 146 to device 106. Device 106 can compute the similarity score for testing instance 146 (function 148), and send a similarity score(s) 150 to device 102 via network 120. Device 102 can define a threshold boundary (function 152), and send a defined threshold 154 back to device 106 via network 120. Upon receiving or determining the defined threshold 154, device 106 can classify testing instance 146 (function 156). Note that device 102 can send, and device 106 can receive or obtain, the defined threshold at a time or in a sequence of communication other than as depicted in environment 100. Alternatively, device 106 can determine the boundary threshold.

Subsequently, device 106 can send a classification(s) 160 back to device 102 via network 120, which allows user 112 to use the results of the enhanced data mining and outlier detection in the single class of data using unlabeled training instances. For example, based on the results of the testing data (e.g., classification(s) 160), user 112 can perform or take a remedial or other action which can affect and improve the operation and performance of a manufacturing system or other physical system associated with room 130 and devices 132.1-132.$m$ in room 130. User 112 can also monitor, observe, and classify subsequent testing data to determine whether the actions of user 112 have the intended effect, including the removal or deletion of any previously detected anomalies.

Exemplary Data Setup and Results

FIG. 2 illustrates an exemplary data setup 200 for facilitating anomaly detection, in accordance with an embodiment of the present invention. Data setup 200 can include: training data 202, which can be, e.g., a one month 203 of time series data; and testing data 204, which can be, e.g., a one day 205 of time series data.

FIG. 3A illustrates an exemplary result 300 of a normal testing instance, in accordance with an embodiment of the present invention. Result 300 indicates a defined threshold 301 and several training instances or training data points, e.g., 304, 306, 308, 310, 312, and 314. Result 300 also depicts a testing instance 302, which occurs within defined threshold 301, thus indicating that testing instance 302 is a normal instance. The system can compute a similarity score to determine whether testing instance 302 falls within the predefined threshold boundary. Note that the similarity score is depicted based on a linear proximity of the testing instance to the training data, but that any relevant or appropriate similarity function may be used.

FIG. 3B illustrates an exemplary result 320 of an anomaly testing instance, in accordance with an embodiment of the present invention. Result 320 depicts a testing instance 322 which does not fall within or which falls outside of defined threshold 301, thus indicating that testing instance 322 is an anomaly.

Exemplary Data

Figure 4:
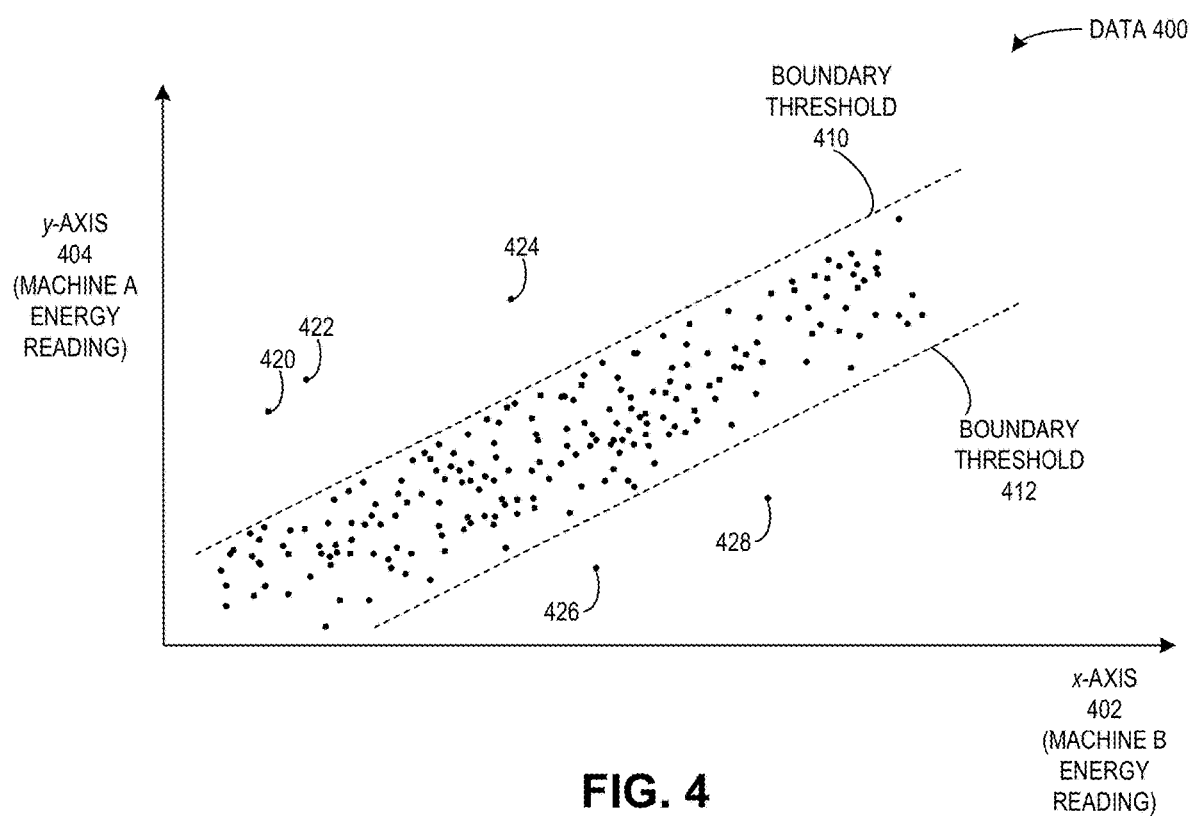
FIG. 4 illustrates exemplary data, in accordance with an embodiment of the present invention.

FIG. 4 illustrates exemplary data 400, in accordance with an embodiment of the present invention. FIG. 4 includes an x-axis 402 representing an energy reading from a Machine B, and a y-axis 404 representing an energy reading from a Machine A. Machine A and Machine B may be related to each other, e.g., certain processes may be performed sequentially on or between the two machines. Training data may be obtained and a boundary threshold 410 may be determined based on the training data. Note that the training data may consist of unlabeled data which is presumed to be within a "normal" range.

For each testing instance in a set of testing instances, the system can compute a similarity score based on a similarity function which takes as input a respective testing instance and the set of training instances. Testing instances which occur within the predefined boundary threshold (e.g., between a boundary threshold 410 and a boundary threshold 412) can be classified as normal, while testing instances which occur outside of the predefined boundary threshold can be classified as abnormal or as an anomaly (e.g., testing instances 420, 422, 424, 426, and 428).

Figure 5:
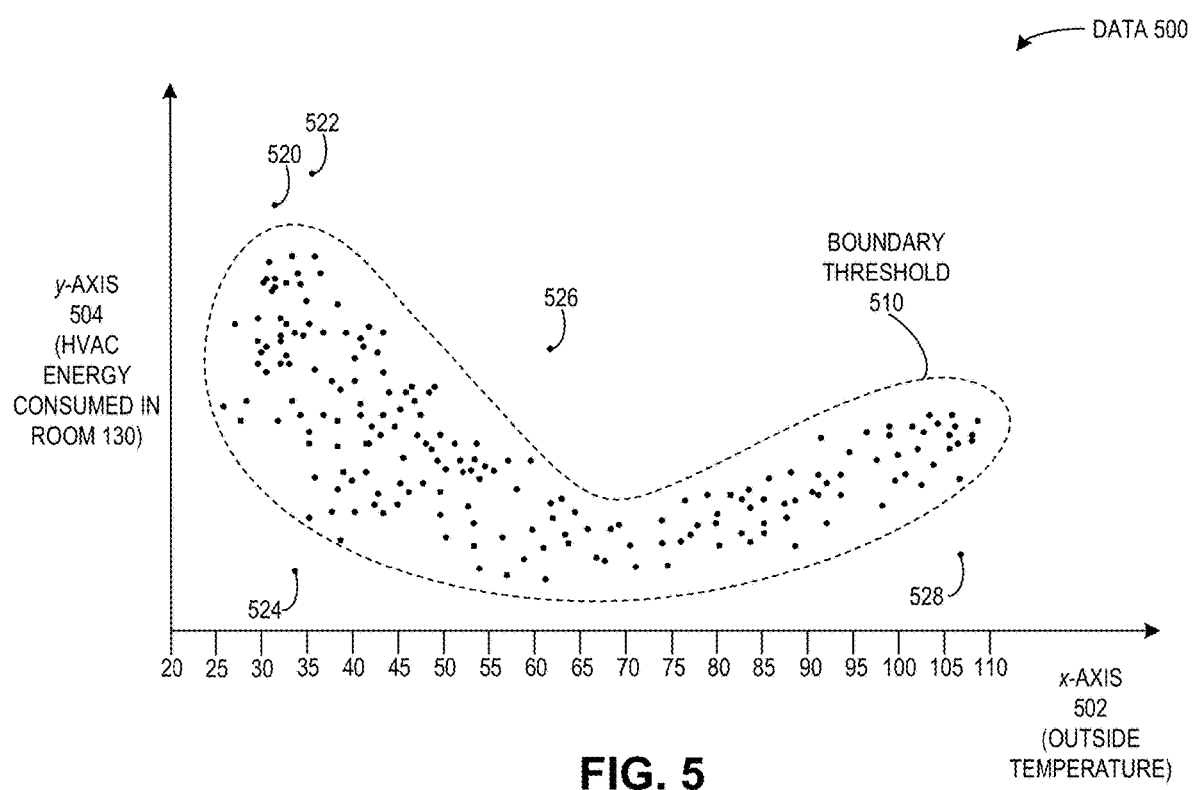
FIG. 5 illustrates exemplary data, in accordance with an embodiment of the present invention.

FIG. 5 illustrates exemplary data 500, in accordance with an embodiment of the present invention. FIG. 5 includes an x-axis 502 representing the outside temperature (e.g., as obtained from sensor 136 of FIG. 1), and a y-axis 504 representing the HVAC energy consumed in room 130 or by a specific device in room 130 (e.g., as obtained from sensor 134.1 of FIG. 1). Training data or instances may be obtained and a boundary threshold 510 may be determined based on the training data. Note that the training data or instances may consist of unlabeled data which is presumed to be within a "normal" range, and that the boundary threshold may track to a linear function (as in FIG. 4) or a non-linear function (as in FIG. 5).

For each testing instance in a set of testing instances, the system can compute a similarity score based on a similarity function which takes as input a respective testing instance and the set of training instances. Testing instances which occur within the predefined boundary threshold (e.g., within a non-linear boundary threshold 510) can be classified as normal, while testing instances which occur outside of the predefined boundary threshold can be classified as abnormal or as an anomaly (e.g., testing instances 520, 522, 524, 526, and 528).

Thus, by using training data which represents a single class of data associated with a physical system (e.g., using an unsupervised method with unlabeled training data), the embodiments described herein provide an enhanced method of detecting anomalies in the physical system. This in turn allows a user to take actions based on the detected anomalies, which results in improving the overall efficiency and performance of the physical system.

Method for Facilitating Anomaly Detection

In the embodiments described herein, the system can determine a set of testing instances and compute a similarity score for each testing instance. The similarity score can be expressed as follows:

$$\omega = \sum_{x_i \in X} S \langle x_i, z_j \rangle \qquad \text{Equation (1)}$$

X is a set of training instances which are assumed to be normal data points. Z is a set of testing instances. S is an arbitrary similarity function such as the radial basis function, linear kernel function, or a polynomial function of some degree d, etc. Given a specific test instance $z_j$ from Z, the system can compute Equation (1) to obtain a similarity score for the specific test instance. The system can repeat this calculation for each test instance in Z (e.g., the set of testing instances), which results in obtaining a similarity score for each of the test instances in Z. From these similarity scores, the system can derive a ranking by ordering the similarity scores from smallest to largest such that the test instance with the smaller similarity score is first, followed by the second, etc. The system can then define a thresholding function, and use the thresholding function to quickly determine the anomalies.

Figure 6:
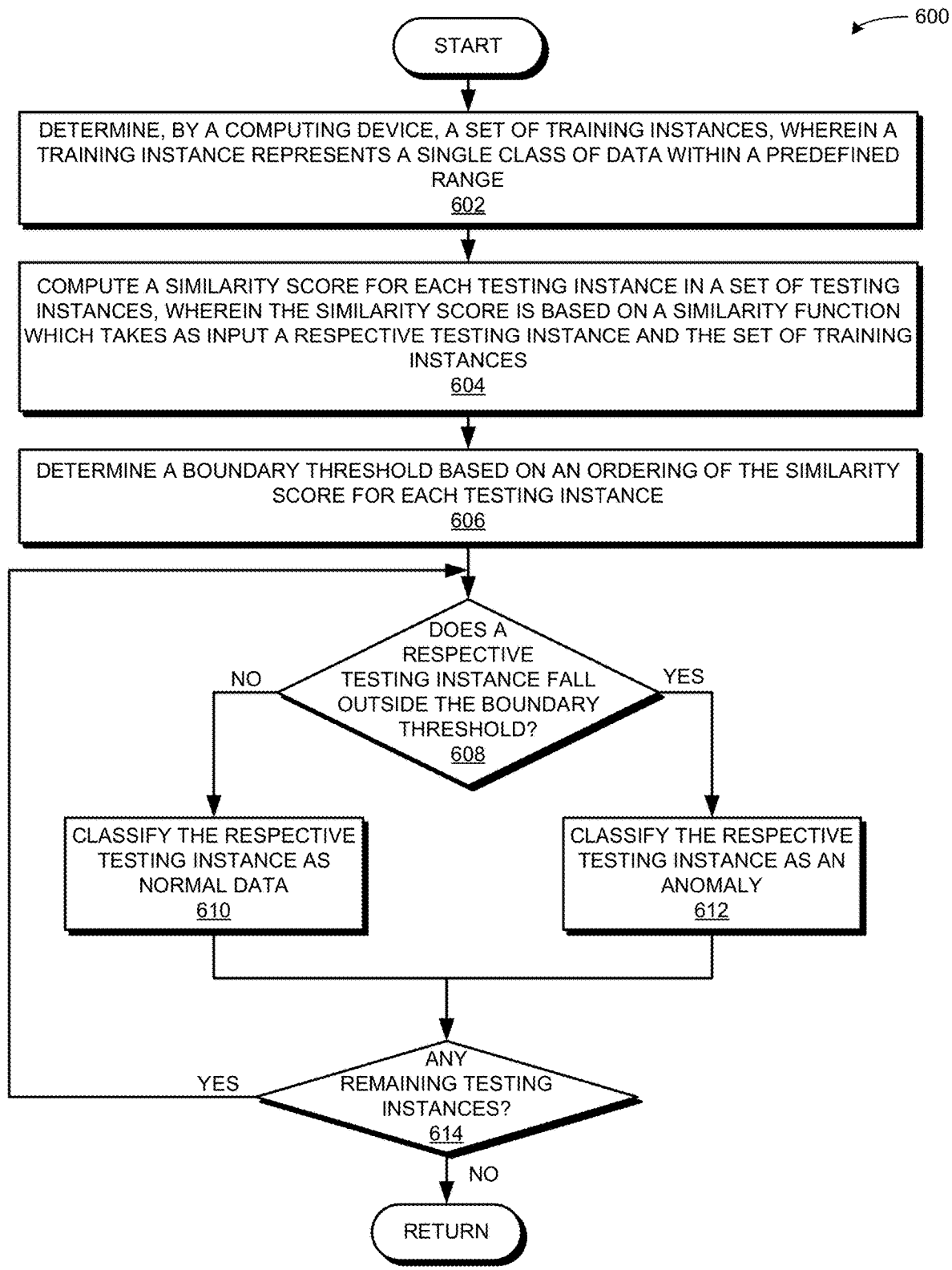
FIG. 6 presents a flow chart illustrating a method for facilitating anomaly detection, in accordance with an embodiment of the present invention.

FIG. 6 presents a flow chart 600 illustrating a method for facilitating anomaly detection, in accordance with an embodiment of the present invention. During operation, the system determines, by a computing device, a set of training instances, wherein a training instance represents a single class of data within a predetermined range (operation 602). The system can also pre-process the training data by determining and removing anomalies from the training data. Pre-processing the data can improve the robustness of the training data, which can also improve the ability of the system to detect potential anomalies in the test data.

The system computes a similarity score for each testing instance in a set of testing instances, wherein the similarity score is based on a similarity function which takes as input a respective testing instance and the set of training instances (operation 604). The system can also apply, to the training instances and the test instances, a normalization or scaling technique, e.g., a minimum maximum scaling technique, an L1-norm or a least absolute deviations method, an L-2 norm or a least squares method, or any normalization or scaling technique. The system can apply the normalization or scaling technique to each feature vector (i.e., the values of all the time series variables at a given point in time). Prior to computing the similarity scores, the system can also reduce the number of training instances, e.g., by downsampling the training data or removing redundant training instances. Reducing the training data can improve the runtime of the system, as the system need only compare a testing instance to a small representative set of training instances (e.g., a downsampled and reduced portion of time series data over a month as opposed to a full month of data).

The system determines a boundary threshold based on an ordering of the similarity score for each testing instance (operation 606). If the respective testing instance does not fall outside the boundary threshold (decision 608), the system classifies the respective testing instance as normal data (operation 610), and proceeds to decision 614. If the respective testing instance does fall outside the boundary threshold (decision 608), the system classifies the respective testing instance as abnormal data or an anomaly (operation 612), and proceeds to decision 614.

If there are remaining test instances (decision 614), the operation continues at decision 608 as described above. If there are no remaining testing instances (decision 614), the operation returns. The system can also compute a second similarity score for each training instance (between each pair of training instances), and determine a second boundary threshold, and classify a testing instance based on the second boundary threshold (not depicted). That is, the system can obtain similarity scores between all training data points, and use these similarity scores as a basis for determining whether a test data point is normal or an anomaly based on a threshold. For example, if a test data point $z_3$ is normal, the similarity score derived from it should lie around the middle (if the similarity scores are ordered from largest to smallest). However, if the similarity score for $z_3$ lies on the lower end of the distribution, the test data point is more likely to be an anomaly. As described above, the system can use any arbitrary similarity function to compute the similarity score. The system can also use a distance function, but would need to reverse the ordering as described above in relation to Equation (1).

Exemplary Computer and Communication System

Figure 7:
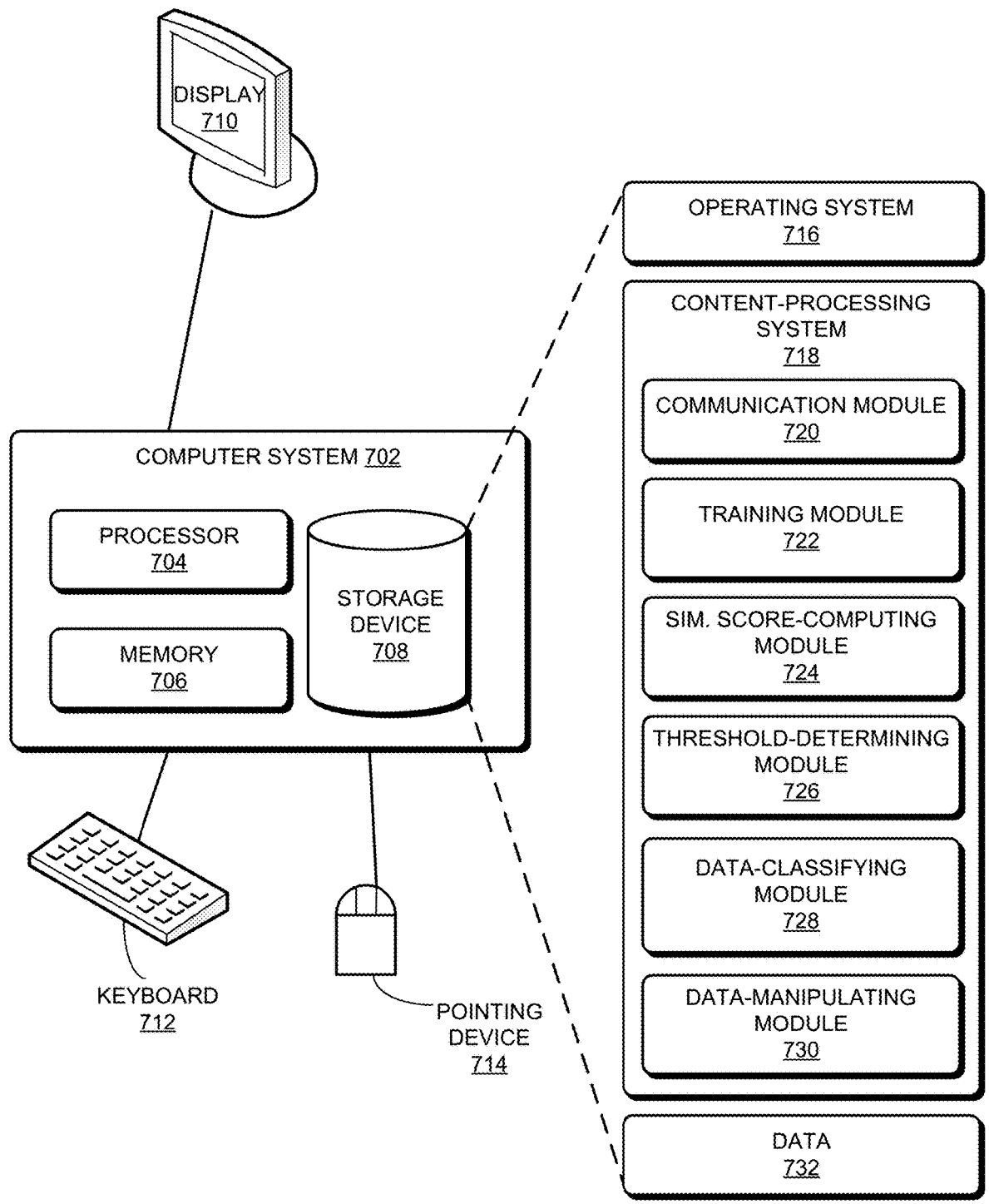
FIG. 7 illustrates an exemplary distributed computer and communication system that facilitates anomaly detection, in accordance with an embodiment of the present invention.

FIG. 7 illustrates an exemplary distributed computer and communication system 702 that facilitates anomaly detection, in accordance with an embodiment of the present invention. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store an operating system 716, a content-processing system 718, and data 732.

Content-processing system 718 can include instructions, which when executed by computer system 702, can cause computer system 702 to perform methods and/or processes described in this disclosure. Specifically, content-processing system 718 may include instructions for sending and/or receiving data packets to/from other network nodes across a computer network (communication module 720). A data packet can include data, time series data, training data, a similarity score, a training instance, and a testing instance.

Content-processing system 718 can further include instructions for determining, by a computing device, a set of training instances, wherein a training instance represents a single class of data within a predefined range (training module 722). Content-processing system 718 can include instructions for computing a similarity score for each testing instance in a set of testing instances, wherein the similarity score is based on a similarity function which takes as input a respective testing instance and the set of training instances (similarity score-computing module 724). Content-processing system 718 can include instructions for determining a boundary threshold based on an ordering of the similarity score for each testing instance (threshold-determining module 726). Content-processing system 718 can include instructions for classifying a first testing instance as an anomaly responsive to determining that the first testing instance falls outside the boundary threshold (data-classifying module 728). Content-processing system 718 can include instructions for enhancing data mining and outlier detection in the single class of data using unlabeled training instances (data-manipulating module 730).

Content-processing system 718 can additionally include instructions for pre-processing the set of training instances by: determining one or more potential anomalies in the set of training instances; and removing the one or more potential anomalies based on a method for detecting outliers in a set of data (data-manipulating module 730). Content-processing system 718 can include instructions for applying, to the training instances and the test instances, a normalization or a scaling technique (data-manipulating module 730). Content-processing system 718 can include instructions for reducing a total number of the training instances (data-manipulating module 730).

Content-processing system 718 can include instructions for computing a second similarity score for each training instance, wherein the second similarity score is based on a second similarity function which takes as input a respective training instance and each of a remainder of the training instances (similarity score-computing module 724). Content-processing system 718 can include instructions for determining a second boundary threshold based on an ordering of the second similarity score for each training instance (threshold-determining module 726). Content-processing system 718 can include instructions for classifying a second testing instance as an anomaly responsive to determining that the second testing instance falls outside the second boundary threshold (data-classifying module 728).

Data 732 can include any data that is required as input or that is generated as output by the methods and/or processes described in this disclosure. Specifically, data 732 can store at least: data; a training instance; a set of training instances; a testing instance; a set of testing instances; a class of data within a predefined range; a predefined range for a class of data; a similarity score; a testing instance; a similarity function; a radial basis function; a linear kernel function; a polynomial function of a predetermined degree; characteristics of the training instances and the testing instances; a similarity score for a testing instance based on a similarity function; a normalization or scaling technique; a minimum maximum scaling technique; an L1-norm; an L2-norm; a feature vector; values of time series variables; one or more points in time; a downsampling technique; and a technique that reduces the total number of the training instances.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating anomaly detection, the method comprising:
   determining, by a computing device, a set of training instances, wherein a training instance represents a single class of data associated with a physical system and within a predefined range;
   computing a first similarity score for each testing instance in a set of testing instances, wherein the first similarity score is based on a similarity function which takes as input a respective testing instance and the set of training instances;
   determining a first boundary threshold based on an ordering of the first similarity score for each testing instance;
   classifying a first testing instance as an anomaly responsive to determining that the first testing instance falls outside the first boundary threshold;
   computing a second similarity score for each training instance, wherein the second similarity score is based on a second similarity function which takes as input a respective training instance and each of a remainder of the set of training instances;
   determining a second boundary threshold based on an ordering of the second similarity score for each training instance; and
   classifying a second testing instance as an anomaly responsive to determining that the second testing instance falls outside the second boundary threshold,
   thereby enhancing data mining and outlier detection in the single class of data using unlabeled training instances.

2. The method of claim 1, wherein the similarity function is based on one or more of:
   a radial basis function;
   a linear kernel function;
   a polynomial function of a predetermined degree;
   a similarity function which meets specific characteristics of the training instances and the testing instances; and
   any similarity function.

3. The method of claim 1, wherein prior to computing the first similarity score for each testing instance, the method further comprises:
   pre-processing the set of training instances by:
      determining one or more potential anomalies in the set of training instances; and
      removing the one or more potential anomalies based on a method for detecting outliers in a set of data.

4. The method of claim 1, further comprising:
   applying, to the training instances and the test instances, a normalization or a scaling technique based on one or more of:
   a minimum maximum scaling technique;
   an L1-norm or a least absolute deviations method;
   an L2-norm or a least squares method; and
   any normalization or scaling technique.

5. The method of claim 4, wherein applying the normalization or the scaling technique further comprises applying the normalization or the scaling technique to one or more of:
   a feature vector, wherein the feature vector describes a set of numeric features associated with an object or a testing instance;
   values of time series variables at a first point in time, wherein the set of training instances and the set of testing instances include the time series variables at multiple points in time; and
   each time series variable.

6. The method of claim 1, wherein prior to computing the first similarity score for each testing instance, the method further comprises:
   reducing a total number of the training instances based on one or more of:
   a downsampling technique;
   removing redundant training instances; and
   a technique that reduces the total number of the training instances.

7. A computer system for facilitating characterization of a time series of data associated with a physical system, the computer system comprising:
   a processor; and
   a storage device storing instructions that when executed by the processor cause the processor to perform a method, the method comprising:
      determining, by the computer system, a set of training instances, wherein a training instance represents a single class of data associated with a physical system and within a predefined range;
      computing a first similarity score for each testing instance in a set of testing instances, wherein the first similarity score is based on a similarity function which takes as input a respective testing instance and the set of training instances;
      determining a first boundary threshold based on an ordering of the first similarity score for each testing instance;
   classifying a first testing instance as an anomaly responsive to determining that the first testing instance falls outside the first boundary threshold;
      computing a second similarity score for each training instance, wherein the second similarity score is based on a second similarity function which takes as input a respective training instance and each of a remainder of the set of training instances;
      determining a second boundary threshold based on an ordering of the second similarity score for each training instance; and
      classifying a second testing instance as an anomaly responsive to determining that the second testing instance falls outside the second boundary threshold,
      thereby enhancing data mining and outlier detection in the single class of data using unlabeled training instances.

8. The computer system of claim 7, wherein the similarity function is based on one or more of:
- a radial basis function;
- a linear kernel function;
- a polynomial function of a predetermined degree;
- a similarity function which meets specific characteristics of the training instances and the testing instances; and
- any similarity function.

9. The computer system of claim 7, wherein prior to computing the first similarity score for each testing instance, the method further comprises:
- pre-processing the set of training instances by:
  - determining one or more potential anomalies in the set of training instances; and
  - removing the one or more potential anomalies based on a method for detecting outliers in a set of data.

10. The computer system of claim 7, wherein the method further comprises:
- applying, to the training instances and the test instances, a normalization or a scaling technique based on one or more of:
  - a minimum maximum scaling technique;
  - an L1-norm or a least absolute deviations method;
  - an L2-norm or a least squares method; and
  - any normalization or scaling technique.

11. The computer system of claim 10, wherein applying the normalization or the scaling technique further comprises applying the normalization or the scaling technique to one or more of:
- a feature vector, wherein the feature vector describes a set of numeric features associated with an object or a testing instance;
- values of time series variables at a first point in time, wherein the set of training instances and the set of testing instances include the time series variables at multiple points in time; and
- each time series variable.

12. The computer system of claim 7, wherein prior to computing the first similarity score for each testing instance, the method further comprises:
- reducing a total number of the training instances based on one or more of:
  - a downsampling technique;
  - removing redundant training instances; and
  - a technique that reduces the total number of the training instances.

13. A non-transitory computer-readable storage medium storing instructions that when executed by a computer cause the computer to perform a method, the method comprising:
- determining, by the computer system, a set of training instances, wherein a training instance represents a single class of data associated with a physical system and within a predefined range;
- computing a first similarity score for each testing instance in a set of testing instances, wherein the first similarity score is based on a similarity function which takes as input a respective testing instance and the set of training instances;
- determining a first boundary threshold based on an ordering of the first similarity score for each testing instance;
- classifying a first testing instance as an anomaly responsive to determining that the first testing instance falls outside the first boundary threshold;
- computing a second similarity score for each training instance, wherein the second similarity score is based on a second similarity function which takes as input a respective training instance and each of a remainder of the set of training instances;
- determining a second boundary threshold based on an ordering of the second similarity score for each training instance; and
- classifying a second testing instance as an anomaly responsive to determining that the second testing instance falls outside the second boundary threshold,
- thereby enhancing data mining and outlier detection in the single class of data using unlabeled training instances.

14. The storage medium of claim 13, wherein the similarity function is based on one or more of:
- a radial basis function;
- a linear kernel function;
- a polynomial function of a predetermined degree;
- a similarity function which meets specific characteristics of the training instances and the testing instances; and
- any similarity function.

15. The storage medium of claim 13, wherein prior to computing the first similarity score for each testing instance, the method further comprises one or more of:
- pre-processing the set of training instances by:
  - determining one or more potential anomalies in the set of training instances; and
  - removing the one or more potential anomalies based on a method for detecting outliers in a set of data; and
- reducing a total number of the training instances based on one or more of:
  - a downsampling technique;
  - removing redundant training instances; and
  - a technique that reduces the total number of the training instances.

16. The storage medium of claim 13, wherein the method further comprises:
- applying, to the training instances and the test instances, a normalization or a scaling technique based on one or more of:
  - a minimum maximum scaling technique;
  - an L1-norm or a least absolute deviations method;
  - an L2-norm or a least squares method; and
  - any normalization or scaling technique.

17. The storage medium of claim 16, wherein applying the normalization or the scaling technique further comprises applying the normalization or the scaling technique to one or more of:
- a feature vector, wherein the feature vector describes a set of numeric features associated with an object or a testing instance;
- values of time series variables at a first point in time, wherein the set of training instances and the set of testing instances include the time series variables at multiple points in time; and
- each time series variable.

* * * * *